F. H. PAGE.
LAMINATION FOR DISTRIBUTING TENSION STRAINS ON SPARS OF AIRCRAFT.
APPLICATION FILED JUNE 23, 1919.
1,320,342.
Patented Oct. 28, 1919.
2 SHEETS—SHEET 2.
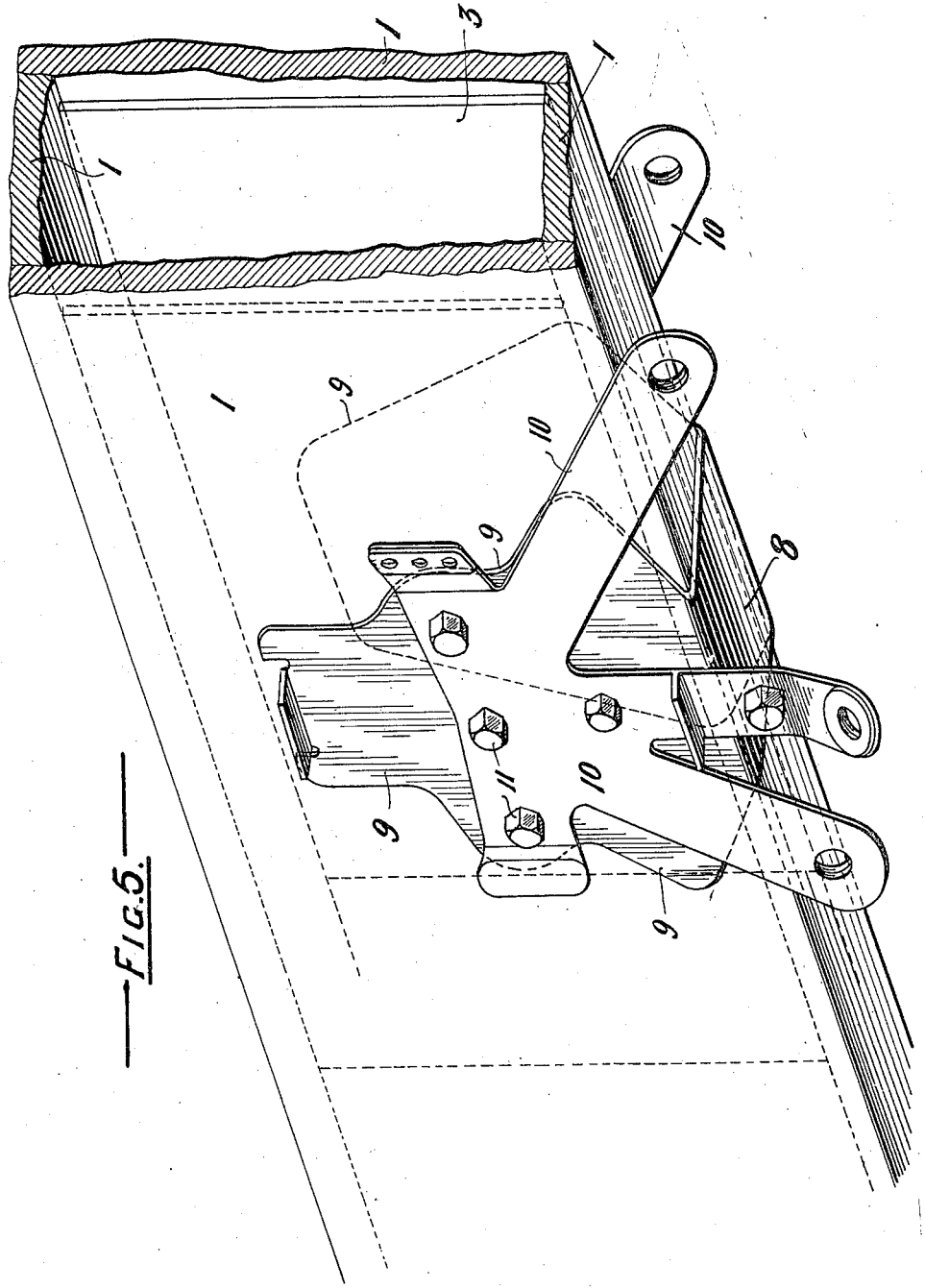

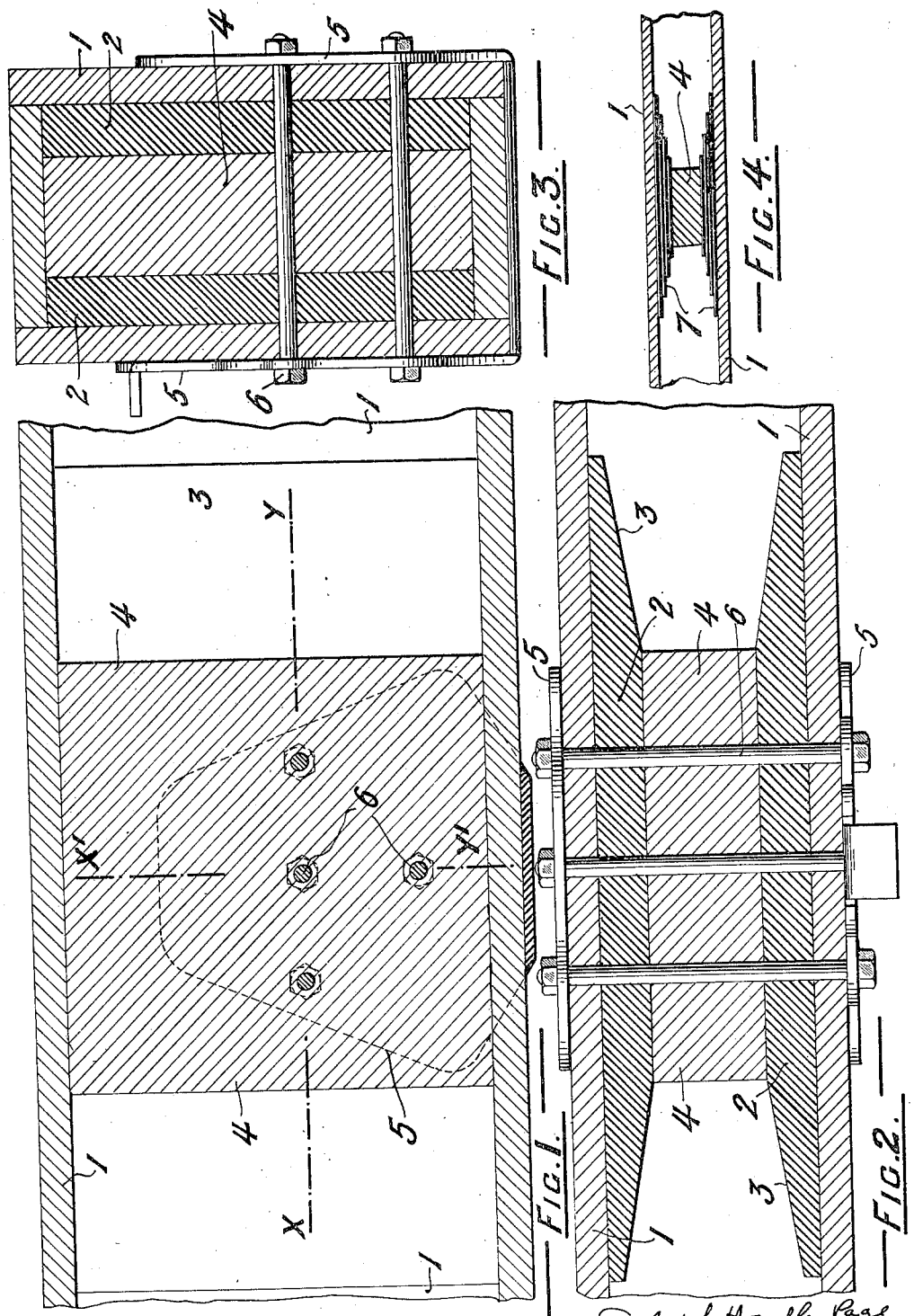

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

LAMINATION FOR DISTRIBUTING TENSION STRAINS ON SPARS OF AIRCRAFT.

1,320,342.  Specification of Letters Patent.  Patented Oct. 28, 1919.

Application filed June 23, 1919. Serial No. 306,244.

*To all whom it may concern:*

Be it known that I, FREDERICK HANDLEY PAGE, a subject of the King of Great Britain, residing at London, England, have invented certain new and useful Improvements in Laminations for Distributing Tension Strains on Spars of Aircraft, of which the following is a specification.

The present invention relates to improvements in struts, spars, and the like structural parts for aircraft.

According to the present invention, a strut or spar primarily intended to support or withstand an axial load or strain, has its cross-section increased at those parts where, for instance, it may have to withstand the bending moment of supports connected to it, by the application of laminations of wood or the like material.

These laminations glued or otherwise secured together and to the strut or spar, may be tapered off on either side of the point receiving the load. In a hollow box-section spar, taken by way of example, it may be internally strengthened by laminations applied one on the other on its four sides until the desired cross-section is attained.

Such strengthening will also be particularly suitable where the spar is to be pierced by connection bolts or the like.

Further, at those places where a connection involving shearing stress is made between a metal clip or the like of steel or other rigid metal, and a part such as a spar or strut of wood or the like soft material, presenting, especially as in the case of spruce, a particular readiness to cleavage between bark rings of the timber, there is interposed a plate of material such as aluminium, ply-wood or the like, light in weight. This plate thereby presents an increased frictional surface over the wooden spar or the like, over which the stress is distributed on a large area, and further, is such that the fastening screws, bolts or the like will not readily shear the said plate.

In a connection between a clip and an aeroplane strut, taken by way of example, the clip of steel would normally be secured to the spar or strut by bolts passing through it. According to the present invention therefore, a plate, for instance of aluminium presenting a considerable surface to the spar is inserted between this and the clip, and the bolts may pass through it, the strain of the said bolts being distributed as a compressive force on the surface of the spar, whereby the tendency to tearing is greatly reduced.

In the accompanying drawings a hollow box-section spar is shown strengthened at that part in its length which is to receive a load or stress Figure 1 is a sectional elevation of such a spar, Fig. 2 a sectional plan view taken on the line X—Y of Fig. 1, and Fig. 3 is a cross-section taken on the line $X^1$—$Y^1$ of Fig. 1. Fig. 4 is a sectional plan view showing laminated strengthening-plates, and Fig. 5 is a perspective view of a hollow spar strengthened internally and externally.

Referring now to Figs. 1 to 3, within the walls 1 of a hollow spar at the point where it is desired to strengthen it, are placed and secured plates 2 which are formed of hard wood and have their end portions 3 reduced in thickness and the space betwen these two plates 2 is filled with a short solid wood packing-piece 4. A metal clip or fitting 5 may then be placed in position on the spar and bolted thereto, the bolts 6 passing through the walls 1, the plates 2 and packing-piece 4. The load or stress to be taken by the spar at this point will thus be distributed over a large area.

It is not always desired to entirely fill the interior of the spar with these strengthening and packing-plates; in some cases the plates 2 are secured to the walls of the spar and the central space between them is left clear.

The plates 2 instead of being of solid hard wood may be formed of ply-wood, or as shown at Fig. 4, laminated plates 7 are secured to each other and to the walls of the spar and the central space either left free or filled by a suitable packing-piece as shown.

Fig. 5 of the drawings shows a hollow spar strengthened as before described with plates placed internally at the point receiving the load or stress and provided externally with a plate of ply-wood or metal such as aluminium of channel section, the part 8 passing beneath the spar and the upstanding parts 9 closely fitting the two sides of the spar and presenting a large area thereto.

Metal clips or fittings 10 may then be attached to the spar, the bolts or other fastenings passing through the parts 9 of the plate and through the walls of the spar. By this means, the parts 9 of the plate are held in close frictional contact with the spar and the stress on the metal fitting 10 is distributed over a large area and the bolts or other fastenings 11 will not be liable to tear or separate the fibers of the wood composing the spar, which latter is liable to occur when soft wood such as spruce is used in constructions of this character.

What I claim as my invention and desire to secure by Letters Patent is:—

In spars for aircraft the combination with the spar, of laminated strengthening-plates consisting of superposed layers each of the outer layers being of decreasing dimensions and means for securing the superposed layers to each other and to the walls of the spar at that point in the length thereof where a stress or load is received.

In witness whereof I have hereunto set my hand in the presence of two witnesses.

FREDERICK HANDLEY PAGE.

Witnesses:
GRIFFITH BREWER,
CYRIL GRIFFITH BREWER.

Copies of this patent may be obtained for five cents each, by addressing the "Commissioner of Patents, Washington, D. C."